United States Patent [19]

Yuki et al.

[11] Patent Number: 5,385,200

[45] Date of Patent: Jan. 31, 1995

[54] CONTINUOUS DIFFERENTIAL-PRESSURE CASTING METHOD WHEREIN MOLTEN METAL TEMPERATURE IS ESTIMATED FROM CONSUMPTION AMOUNT OF POURING TUBE DUE TO IMMERSION IN MOLTEN METAL

[75] Inventors: Isamu Yuki, Toyota; Minoru Uozumi, Aichi, both of Japan

[73] Assignee: Toyota Jidosha Kabushiki Kaisha, Aichi, Japan

[21] Appl. No.: 77,540

[22] Filed: Jun. 17, 1993

[30] Foreign Application Priority Data

Oct. 12, 1992 [JP] Japan ................... 4-300410

[51] Int. Cl.⁶ .................. B22D 11/18; B22D 18/04
[52] U.S. Cl. ..................... 164/457; 164/4.1; 164/119; 374/140
[58] Field of Search ............ 164/457, 4.1, 155.4, 164/155.6, 155.7, 154.2, 154.6, 154.1, 119, 306; 374/139, 140, 142, 102, 106

[56] References Cited

U.S. PATENT DOCUMENTS 3,610,601 10/1971 Bishop, Jr. .................. 374/140
4,182,181 1/1980 Arvai .......................... 374/140
4,585,050 4/1986 Merrien ....................... 164/457

FOREIGN PATENT DOCUMENTS 53-146930 12/1978 Japan ..................... 164/4.1

Primary Examiner—P. Austin Bradley
Assistant Examiner—Erik R. Puknys
Attorney, Agent, or Firm—Oliff & Berridge

[57] ABSTRACT

A casting method wherein casting cycles are continuously performed with respective molds and a common mass of molten metal accommodated in a container, such that in each casting cycle, the mold cavity is filled with the molten metal through a pouring tube connected at one end to a sprue hole of the mold and immersed at the other end in the molten metal mass, due to a difference between pressures to which the mold and the container are exposed, and wherein the molten metal temperature is estimated from the detected amount of consumption of the immersed tube, and the actual molten metal temperature is regulated, on the basis of a difference between a predetermined desired temperature of the molten metal, and the estimated temperature which changes with the actual temperature.

37 Claims, 9 Drawing Sheets

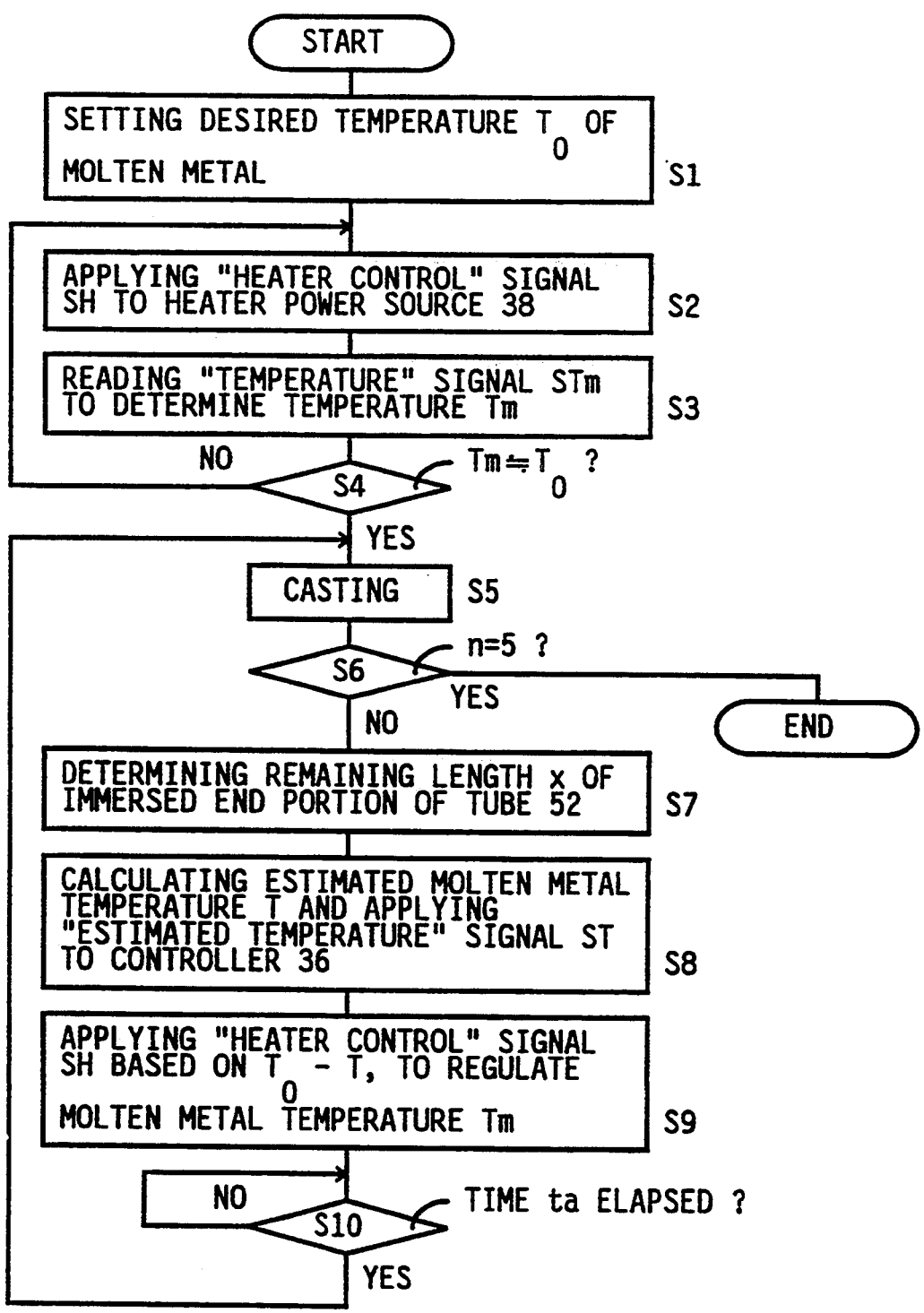

CONTINUOUS DIFFERENTIAL-PRESSURE CASTING METHOD WHEREIN MOLTEN METAL TEMPERATURE IS ESTIMATED FROM CONSUMPTION AMOUNT OF POURING TUBE DUE TO IMMERSION IN MOLTEN METAL

BACKGROUND OF THE INVENTION

1. Field of the Invention

The present invention relates in general to a differential-pressure casting method, and more particularly to a technique for regulating the temperature of a molten metal in a series of casting operations with loading and unloading of casting molds.

2. Discussion of the Prior Art

As one method of casting, there is known a differential-pressure casting process in which a cavity in a mold is filled with a molten metal, through a pouring tube one end of which is connected to a sprue hole of the mold and the other end of which is immersed in the mass of molten metal accommodated in a suitable container or ladle. The molten metal is poured into the mold cavity through the pouring tube, due to a difference between the pressures to which the mold and the molten metal in the container are exposed. With the mold cavity filled with the metal, an article made of the metal has a shape corresponding to that of the mold cavity. For example, such differential-pressure casting process is disclosed in JP-A-57-118853, wherein a pressure-tight container accommodating a mass of molten metal so as to maintain it at an elevated temperature is pressurized by application of up to one atmospheric pressure, to feed the molten metal into the mold cavity through the pouring tube, due to the elevated pressure in the molten metal container. In another known differential-pressure casting process, the mold placed in a pressure-tight vessel is exposed to a reduced pressure, so that the molten metal is introduced into the mold cavity through the pouring tube, under the action of the reduced pressure in the evacuated pressure-tight vessel.

Such differential-pressure casting process using the pouring tube whose lower end portion is immersed in the mass of molten metal to fill the mold cavity is free from otherwise possible introduction into the mold cavity of air, and slag and flux floating on the surface of the molten metal, during the filling of the mold cavity. Further, the differential-pressure casting process permits the molten metal to be continuously fed into the mold cavity even after the solidification of the already introduced metal in the cavity is started, whereby the cast article produced is effectively protected from defects such as blowholes which arise from the metal shrinkage upon solidification. The differential-pressure casting process also permits directional solidification of the molten metal, leading to a sound casting with high air-tightness. Moreover, the process is capable of regulating the elevated pressure in the molten metal container or the reduced pressure in the mold vessel, and therefore permits the molten metal to be sufficiently slowly introduced into the mold cavity, so that sand cores may be used in the mold cavity, as needed, when the article to be cast has a complicated shape. These are some of various advantages of the differential-pressure casting process.

In a casting process as described above, the cast article may suffer from defects such as blowholes or pinholes, particularly when the temperature of the molten metal is excessively high, and may also suffer from "misrun" when the temperature is too low. The "misrun" means incompletely formed casting due to premature solidification of the molten metal before the mold is filled. Thus, the adequate regulation of the molten metal temperature is important to assure consistently high quality of the castings. To this end, the casting is usually performed while measuring and regulating the molten metal temperature. The temperature of the molten metal is generally measured or detected by using a thermocouple made of two dissimilar conductors such as a combination of platinum and platinum/rhodium alloy, or a combination of alumel (Ni/Al/Si/Mn alloy) and chromel (Ni/Cr alloy). To measure the molten metal temperature, the detecting portion of the thermocouple is immersed in a mass of the molten metal.

Where a thermocouple as mentioned above is used to measure the temperature of the molten metal, however, the detecting portion of the thermocouple immersed in the molten metal mass is subject to oxidation, corrosion or contamination due to the molten metal and slag, and tends to suffer from severe physical or chemical deterioration, leading to extremely shortened life expectancy of the thermocouple. The shortening of the service life of the thermocouple is serious particularly when the temperature of the molten metal is comparatively high, as in the case of casing of iron or nickel alloy materials. Consequently, when a series of casting operations is continuously or intermittently performed with replacement of casting molds, accurate measurement and adequate regulation of the molten metal temperature by the thermocouple are possible for only the first casting cycle or shot, and are difficult for the subsequent casting cycles or shots. Accordingly, the quality of the casting is lowered with an increase in the number of the continuous casting cycles performed.

SUMMARY OF THE INVENTION

It is therefore an object of this invention to provide a continuous differential-pressure casting method in which the temperature of the molten metal can be regulated with high accuracy throughout a series of casting operations performed.

The above object may be achieved according to the principle of the present invention, which provides a continuous differential-pressure casting method wherein a plurality of casting cycles are continuously performed with respective molds and a common mass of molten metal accommodated in a container, such that in each casting cycle, a cavity formed in the corresponding mold is filled with the molten metal through a pouring tube which is connected at one end thereof to a sprue hole of the mold and immersed at the other end thereof in the common mass of molten metal, the molten metal being introduced into the cavity due to a difference between pressures to which each of the molds and the container are exposed, respectively, to cast an article having a shape corresponding to that of the cavity, the method comprising the steps of: (a) detecting a degree of consumption of the pouring tube which occurs at the other end and which changes with an actual temperature of the mass of molten metal in the container, after a predetermined number of casting cycles are completed; (b) obtaining an estimated temperature of the mass of molten metal, on the basis of the detected degree of consumption of the pouring tube, and according to a predetermined relationship between the degree of consumption and the estimated temperature; and (c)

regulating the actual temperature of the mass of molten metal, on the basis of a difference between the obtained estimated temperature and a predetermined desired temperature of the mass of molten metal.

In the continuous differential-pressure casting method of the present invention as described above, the degree or amount of consumption of the immersed end portion of the pouring tube is detected after the predetermined number of casting cycles or shots are completed, and the temperature of the molten metal mass in the container is estimated on the basis of the detected degree of consumption of the pouring tube. The actual temperature of the molten metal mass is regulated on the basis of the estimated temperature, prior to the following series of casting cycles, so that the actual temperature coincides with the predetermined optimum or desired temperature with high accuracy. Accordingly, the present method is capable of minimizing defects of the cast articles which arise from a variation in the temperature of the molten metal mass during the continuous implementation of the successive casting cycles. The present method assures improved consistency in the quality of the cast articles produced in the individual casting cycles. Since the regulation of the actual temperature of the molten metal according to the present invention is effected based on the molten metal temperature estimated from the amount or degree of consumption of the immersed end portion of the pouring tube, the required cost for the regulation of the molten metal temperature according to the present invention is considerably reduced as compared with the temperature regulation using an expensive thermocouple whose detecting portion is consumed after a single use in the molten metal and should be replaced with a new one after each casting cycle. Thus, the present casting method permits economical production of desired castings with improved quality.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 5 is a flow chart illustrating a series of casting operations performed by the casting system of FIG. 1, according to the method of this invention;

DETAILED DESCRIPTION OF THE PREFERRED EMBODIMENTS

Figure 1:
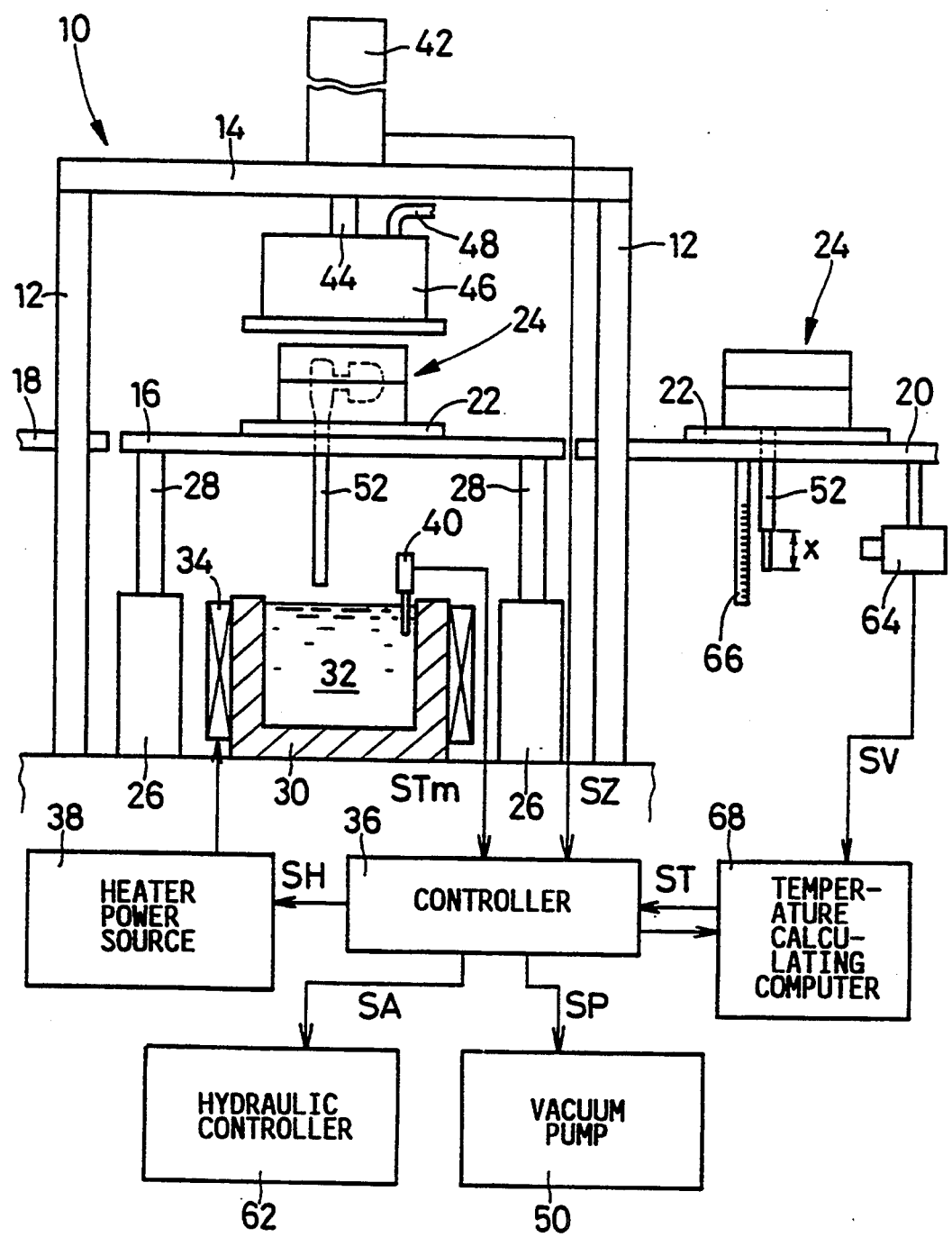
FIG. 1 is a schematic elevational view illustrating a reduced-pressure casting system suitable for practicing one embodiment of a continuous differential-pressure casting method of the present invention.

Referring first to FIG. 1, there is shown one form of a casting system in which the mold assembly is exposed to reduced pressure, and which is suitable for practicing a continuous differential-pressure casting method of this invention. The casing system includes a machine frame 10, which includes four posts 12 and an upper plate 14 disposed atop the posts 12. Within the frame 10, there is provided an elevator 16 on which is placed a surface plate 22 adapted to receive thereon a casting mold 24. The casting system is provided with a mold loading device and a mold unloading device as well known in the art. The casting mold 24 on the surface plate 22 is loaded by the loading device, from a loading table 18 onto the elevator 16, such that the mold 24 is positioned at a predetermined position in the horizontal plane. After a casting operation is finished using the loaded mold 24, the mold 24 is unloaded by the unloading device, from the elevator 16 onto an unloading table 20. The elevator 16 is supported by four constant-pressure cylinders 26, such that the elevator 16 is fixed to the upper ends of output rods 28 of the cylinders 26, which also serve as guides for vertical movements of the elevator 16. A predetermined constant pressure is produced by each cylinder 26, so that the upper end of the corresponding output rod 28 is located at a predetermined uppermost position when the elevator 16 is loaded with the mold 24 and the surface plate 22. Unless or before a further downward force acts on the output rods 28 against the forces produced by the cylinders 26, the output rods 28 are maintained at the uppermost position, namely, an initial vertical position in which the elevator 16 has the same height or level as the loading and unloading tables 18, 20, as indicated in FIG. 1.

The casting system further includes a container in the form of a ladle 30 disposed below the elevator 16, such that the ladle 30 is aligned with the surface plate 22 and the mold 24 positioned on the elevator 16 as described above. The ladle 30 accommodates a mass of molten metal 32, in this embodiment, a heat-resistant cast steel (SCH21) in a molten state. The present casting system is adapted to perform a series of five casting cycles or shots in a continuous or intermittent fashion, as described below. Each time the five casting shots are finished, ingots of the cast steel are introduced into the ladle 30, and heated into a molten state by a high-frequency inductor heater 34 disposed around the ladle 30. The amount or volume of the molten metal mass 32 initially accommodated in the ladle 30 prior to each series of five casting cycles or shots is determined so that about a half of the initial volume of the molten metal mass 32 is used for the five casting shots. The high-frequency induction heater 34 is controlled by a controller 36, to not only melt the ingots indicated above, but also regulate the temperature of the molten metal to be kept at a predetermined desired level during the series of 5-shot casting operations. Described more specifically, the controller 36 applies a HEATER CONTROL signal SH to a heater power source 38, for controlling a power supply to the heater 34, to thereby regulate the molten metal temperature Tm by heating the metal 32 or allowing cooling of the metal by natural radiation, depending upon the ambient temperature and humidity, etc. It is noted that the amount of the molten metal mass 32 left in the ladle 30 decreases as the number of the casting shots increases. The controller 36 has a suitable temperature regulating program for determining the HEATER CONTROL signal SH, depending upon the number of the casting shots or cycles performed, that is, the amount of the molten metal mass 32 left in the ladle 30.

In the vicinity of the ladle 30, there is disposed a thermocouple 40 for detecting or measuring the temperature Tm of the molten metal mass 32 contained therein. The thermocouple 40 has a body portion, and a disposable or replaceable detecting portion removably attached to the body portion. The detecting portion is immersed in the molten metal mass 32 and is thus exposed to the high temperature. When the detecting portion of the thermocouple 40 has been consumed to a certain extent, the consumed detecting portion is replaced with a new one. The detecting portion consists of a suitable composition such as a combination of platinum and a platinum/rhodium alloy, or a combination of alumel (Ni/Al/Si/Mn alloy) and chromel (Ni/Cr alloy). Normally, the thermocouple 40 is placed in a retracted position thereof in which the detecting portion is spaced apart from the molten metal mass 32 in the ladle 30. The detecting portion is immersed or dipped in the molten metal mass 32, either manually by an operator of the casting system, or automatically by a suitable immersing device, only when the temperature Tm of the molten metal mass 32 is measured. The thermocouple 40 generates a TEMPERATURE signal STm representative of the measured temperature Tm. The TEMPERATURE signal STm is received by the controller 36, so that the controller 36 applies the HEATER CONTROL signal SH to the heater power source 38, according to the temperature regulating program indicated above, on the basis of the TEMPERATURE signal STm and other parameters as needed, for maintaining the temperature Tm at the predetermined desired level.

To the upper plate 14, there is fixed a hydraulic cylinder 42 having an output rod 44, which extends downward through the upper plate 14. A pressure-tight closure member 46 of box construction having a lower opening is secured to the lower end of the output rod 44 of the hydraulic cylinder 42. The cylinder 42 is provided with a position sensor for detecting the vertical position of the output rod 44. The position sensor generates a POSITION signal SZ representative of the detected position of the output rod 44. The POSITION signal SZ is fed to the controller 36, which in turn applies a HYDRAULIC CONTROL signal SA to a hydraulic controller 62, so that the hydraulic controller 62 controls the operation of the hydraulic cylinder 42, for positioning the output rod 44 according to the HYDRAULIC CONTROL signal SA, which represents the positions of the rod 44 at which the output rod 44 is stopped during the casting operation and which are determined by the controller 36 according to a position control program.

Thus, the pressure-tight closure member 46 is lowered by the controlled operation of the hydraulic cylinder 42, until the lower end of the closure member 46 abuts on the upper surface of the surface plate 22. The closure member 46 cooperates with the surface plate 22 to pressure-tightly enclose the mold 24. To assure the pressure tightness between the closure member 46 and the surface plate 22, the closure member 46 is provided with a sealing member 70 at an outward flange formed at its lower end at which the closure member 46 contacts the upper surface of the surface plate 22. The closure member 48 is connected to a vacuum pump 50 through a pressure-resistant hose 48. The pump 50 is activated according to a PUMP CONTROL signal SP received from the controller 36, to evacuate the closure member 48 for thereby exposing the mold 24 to a predetermined reduced pressure (below the atmospheric pressure). The surface plate 22 and the mold 24 constitute a mold assembly equipped with a pouring tube 52 whose upper end is connected to a sprue hole 60 formed in the lower surface of the mold 24. The pouring tube 52 is made of a metallic material (iron) which is similar to the cast iron 32 and which has almost the same melting point as the cast iron.

Figure 2:
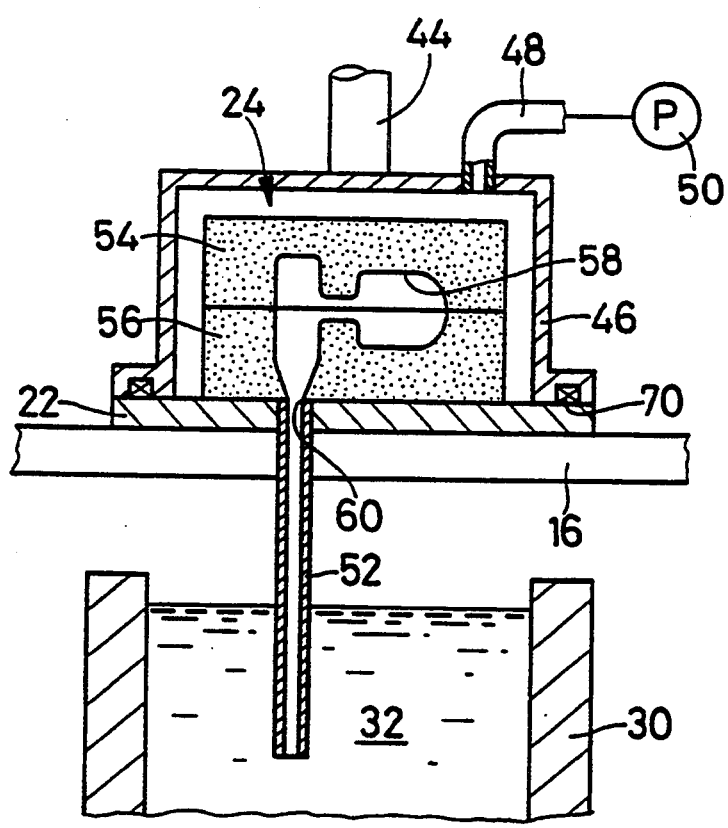
FIG. 2 is a fragmentary elevational view in cross section showing a casting device of the system of FIG. 1 when a pouring tube lowered with a casting mold is immersed at its lower end in a mass of molten metal before the mold is filled with the molten metal through the tube.

As shown in FIG. 2, the mold 24 consists of an upper half 54 and a lower half 56 each of which is formed of a mass of sand or other air-permeable material. The upper and lower halves 54, 56 are butted together so as to form a cavity 58, which communicates with the sprue hole 60 open in the lower lower surface of the lower half 56. The pouring tube 52 extends downward from the sprue hole 60 through the surface plate 22 and the elevator 16. When the mold 24 is placed in position on the surface plate 22, the sprue hole 60 of the mold 24 is pressure-tightly connected to the upper end of the pouring tube 52 fixed to the surface plate 22. The elevator 16 has suitable means for allowing the pouring tube 52 to be moved with the mold assembly 22, 24, relative to the elevator 16 in the horizontal plane, when the mold assembly is loaded onto and unloaded from the elevator 16.

After the closure member 46 is lowered into abutting pressure-tight contact with the surface plate 22, the hydraulic cylinder 42 is operated to lower the elevator 16 together with the mold assembly 22, 24, against the biasing force of the constant-pressure cylinders 26, according to the position control program indicated above, until the elevator 16 is located at a predetermined casting position in which a lower end portion of the pouring tube 52 is immersed in the molten metal mass 32 over a predetermined length. The mold assembly 22, 24 and the pouring tube 52 when the elevator 16 is placed in this casting position are shown in FIG. 2, in relation to the ladle 30.

Figure 3:
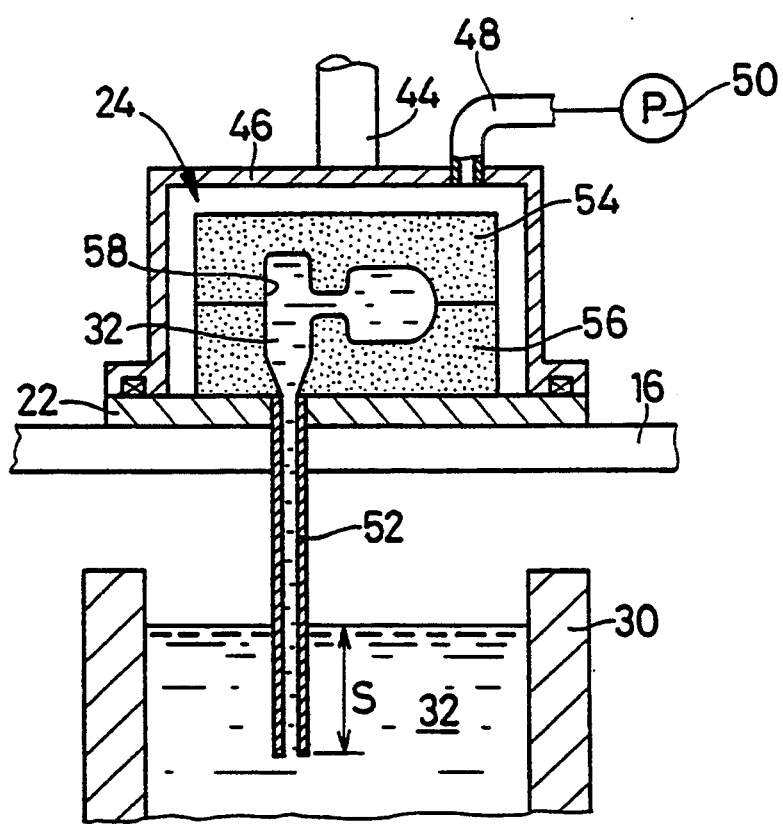
FIG. 3 is a fragmentary elevational view in cross section showing the mold cavity filled with the molten metal with the mold placed under a reduced pressure.

When the vacuum pump 50 is activated in the condition of FIG. 2, the mold cavity 58 formed in the mold 24 is also exposed to a reduced pressure, whereby there arises a pressure difference (e.g., approx. 600 mmHg) between the reduced pressure in the cavity 58 and the atmospheric pressure to which the molten metal mass 32 in the ladle 30 is exposed. As a result, the molten metal 32 is sucked up from the ladle 30 into the mold cavity 58 through the pouring tube 52. The cavity 58 completely filled with the molten metal 32 is shown in FIG. 3. The elevator 16 is held in the casting position of FIG. 3, with the above-indicated pressure difference maintained, for a predetermined length of time necessary to allow the molten metal 32 to cool and solidify. The casting position of the elevator 16 (mold assembly 22, 24) and the initial volume of the molten metal mass 32 in the ladle 30 are determined so that the lower end portion of the pouring tube 52 is immersed in the molten metal 32 over the predetermined nominal length "s" as indicated in FIG. 3.

Figures 4A, 4B, 4C:
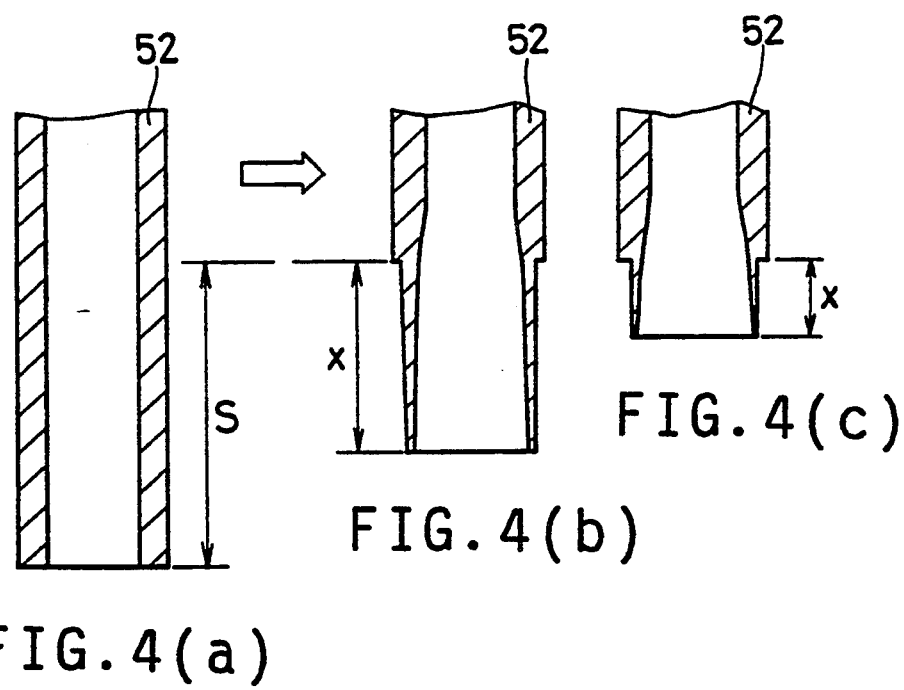
FIG. 4(a) is an elevational view in cross section showing a lower end portion of the pouring tube before the lower end portion is consumed.
FIGS. 4(b) and 4(c) are views corresponding to that of FIG. 4(a), showing examples of the lower end portion of the tube whose length is reduced due to the consumption in use.

However, the immersed end portion of the pouring tube 52 is inevitably more or less melted as part of the molten mass 32 in the ladle 30, that is, partly consumed during the immersion for the above-indicated length of time. Consequently, the length of the immersed lower end portion of the pouring tube 52 decreases from the initial or nominal length "s" indicated in FIG. 4(a) to reduced length "x" (remaining length "x") indicated in FIG. 4(b) or 4(c), for example, depending upon the temperature Tm of the molten metal mass 32 contained in the ladle 30.

Each time a casting shot or cycle is performed using a mold 24, the volume of the molten metal mass 32 left in the ladle 30 is reduced by a predetermined amount. In other words, the surface of the molten metal mass 32 in the ladle 30 is lowered as the number of the casting shots or cycle increases. In the light of this fact, the casting position of the elevator 16 or the corresponding position of the output rod 44 of the hydraulic cylinder 42 is lowered according to the above-indicated position control program, each time a casting shot is finished, so that the lower end portion of each fresh tube 52 is immersed over the nominal length "s".

After the mold assembly 22, 24 is held in the casting position for the predetermined length of time, the hydraulic cylinder 42 is activated to move its output rod 44 to its uppermost position. As a result, the elevator 16 is raised to its initial position of FIG. 1 away from the ladle 30, while the pouring tube 52 is pulled up out of the molten metal mass 32, and the closure member 46 is further raised away from the mold assembly 22, 24 on the elevator 16. Thus, one casting shot or cycle is completed. The mold assembly 22, 24, 52 is then unloaded onto the unloading table 20, as indicated in FIG. 1. The pouring tube 52 is used for one casting shot only and is disposed after the use with the corresponding mold 24. The unloading table 20 is provided with a TV camera 64 and a scale 66 both attached to the underside thereof. The TV camera 64 is positioned so as to face the lower end of the pouring tube 52, and the scale 66 is disposed near the tube 52, so as to cover the lower end portion of the tube 52. The TV camera 64 takes a picture which includes an image of the consumed lower end portion (having the remaining length "x") of the tube 52, and an image of the graduated portion of the scale 66 as the background of the length "x". The camera 64 produces a VIDEO signal SV representative of the picture image, which is received by a temperature calculating computer 68. This computer 68 processes the VIDEO signal SV to determine the remaining length "x" of the immersed lower end portion of the tube 52, and calculates an estimated temperature T of the molten metal 32 on the basis of the determined remaining length "x". The computer 68 applies to the controller 36 an ESTIMATED TEMPERATURE signal ST representative of the calculated estimated temperature T of the molten metal 32. On the basis of the signal ST, the controller 36 executes a casting control routine as illustrated in the flow chart of FIG. 5, in which a series of operations (consisting of five casting shots or cycles) is continuously or intermittently effected while the temperature Tm of the molten metal 32 is regulated by the induction heater 34 by means of the heater power source 38. Each of the controller 36 and the temperature calculating computer 68 may be microcomputer incorporates a central processing unit, a read-only memory and a random-access memory. For example, the microcomputer for the controller 36 is adapted to perform various processing operations, based on the various input signals, and according to the above-indicated position control program and temperature regulating program stored in the read-only memory, while utilizing a temporary data storage function of the random-access memory.

Referring next to the flow chart of FIG. 5, there will be described the casting operation in the present embodiment of the invention. Initially, step S1 is implemented to set a desired temperature $T_0$ of the molten metal mass 32 in the ladle 30. This setting of the desired temperature $T_0$ is effected manually by an operator through a suitable data input device provided on the controller 36, or automatically on the basis of data representative of the desired temperature $T_0$ stored in the controller 36. In the latter case, the desired temperature $T_0$ may be changed by the operator. In the present example, the desired temperature $T_0$ of the molten metal 32 is set at 1510° C.

Step S1 is followed by step S2 in which the HEATER CONTROL signal SH is applied to the heater power source 38, to control the induction heater 34 for controlling the actual temperature Tm of the molten metal 32 in the ladle 30. Then, the control flow goes to step S3 in which the controller 36 determines the temperature Tm, on the basis of the TEMPERATURE signal STm received from the thermocouple 40 whose detecting portion is immersed in the molten metal mass 32. Step S3 is followed by step S4 to check if the temperature Tm determined is almost equal to the desired temperature value $T_0$ set in step S1. More particularly, step S4 is provided to determine whether the temperature Tm is within a range between 1500° C. and 1520° C., namely, within a range of $T_0 \pm 10°$ C. If the temperature Tm is outside this specified range, the control returns to step S2. Steps S2 through S4 are repeatedly implemented until an affirmative decision (YES) is obtained in step S4. If the temperature Tm is within the specified range or has been controlled to fall within the range, the following step S5 is implemented to effect casting as described below. In the present example, it is assumed that the article to be produced is likely to suffer from the so-called "misrun" explained above if the temperature Tm of the molten metal 32 is lowered below 1490° C., and easily has blowholes if the temperature Tm exceeds 1530° C.

In step S5, the HYDRAULIC CONTROL signal SA is applied from the controller 36 to the hydraulic controller 62 to activate the hydraulic cylinder 42, for first lowering the closure member 46 into pressure-tight contact with the surface plate 22, to enclose the mold 24, and for then lowering the elevator 16 together with the mold assembly 22, 24, 52 and the closure member 46, to the predetermined casting position in which the lower end portion of the pouring tube 52 is immersed in the molten metal mass 32 over the predetermined or nominal length "s". Subsequently, the PUMP CONTROL signal SP is fed from the controller 36 to the vacuum pump 50, for starting the evacuation of the pressure-tight closure member 46 and the mold cavity 58, so that the molten metal 32 is introduced into the mold cavity 58 through the pouring tube 52. In the present example, the cavity 58 is filled with a mass of about 20 kg of the molten metal 32, and the total casting time is about 60 seconds. The total casting time includes about six seconds during which the lower end portion of the tube 52 is kept immersed in the molten metal mass 32 in the ladle 30. After the cavity 58 is filled, the hydraulic cylinder 42 is again activated to raise the output rod 44 to return the elevator 16 and the closure member 46 to the initial vertical positions of FIG. 1, and the mold assembly 22, 24, 52 is unloaded from the elevator 16 onto the unloading table 20.

The control then goes to step S6 to determine whether the number "n" of successive casting shots which have been performed is equal to a predetermined number, in this example, "5". If the five casting shots have been performed or an affirmative decision (YES) is obtained in step S6, the routine of FIG. 5 is terminated. If the number "n" is smaller than "5" or a negative decision (NO) is obtained in step S6, the control goes to step S7.

Figure 7:
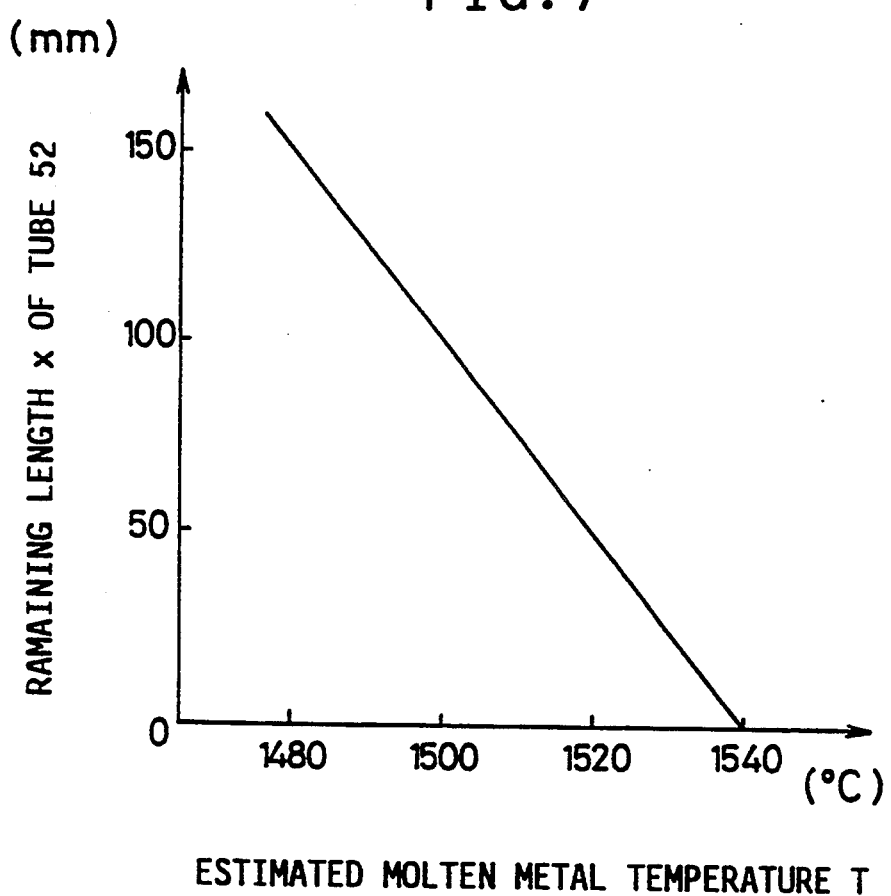
FIG. 7 is a graph indicating an example of a T-x data map representative of a T-x relationship which is used in step S8 of the flow chart of FIG. 5 and obtained on the basis of the T-x relationship data of FIG. 8.
Figure 8:
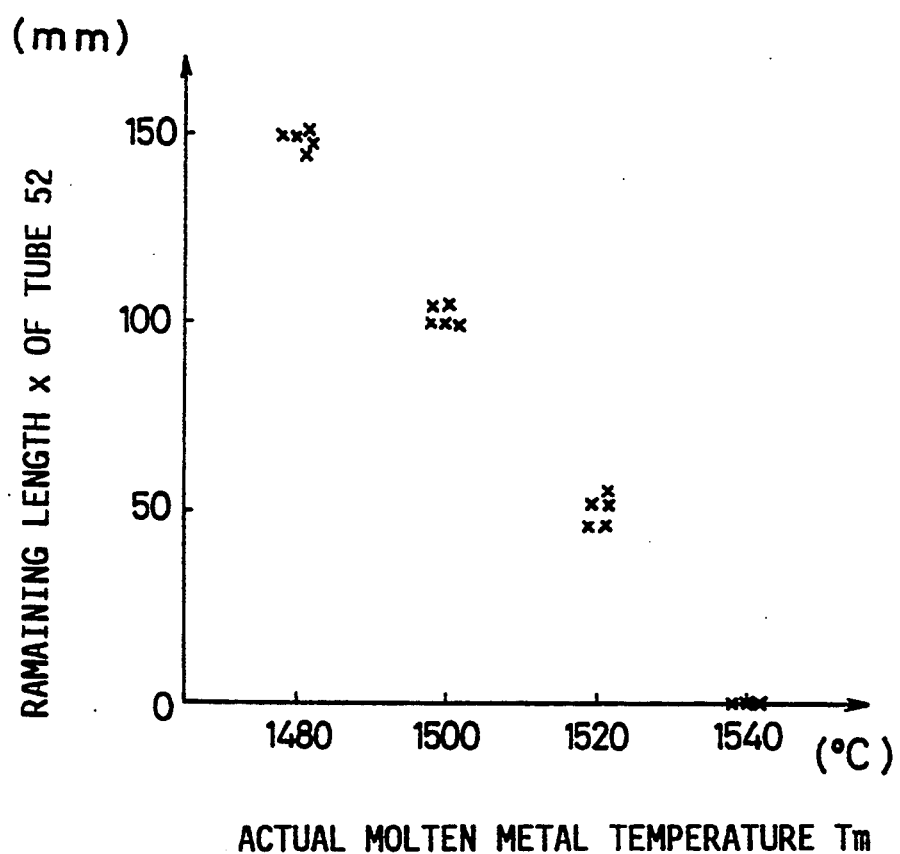
FIG. 8 is a graph indicating the Tm-x relationship data (molten metal temperature vis-a-vis the remaining length of the lower end portion of the used pouring tube) obtained by a test casting according to the flow chart of FIG. 6.

In step S7, the remaining length "x" of the immersed end portion of the pouring tube 52 of the mold assembly 22, 24, 52 now placed on the unloading table 20 after the casting in step S5 is determined on the basis of the VIDEO signal SV supplied from the TV camera 64 to the temperature calculating computer 68. The VIDEO signal SV represents the picture which includes the image of the immersed end portion of the tube 52, whose remaining length "x" is superimposed on the background image of the graduation of the scale 66 and can be determined by reading the graduation. Step S7 is followed by step S8 in which the computer 68 calculates an estimated temperature T of the molten metal mass 32 in the ladle 30, on the basis of the determined remaining length "x", and according to a data map stored in the computer 68. The ESTIMATED TEMPERATURE SIGNAL ST representative of the calculated estimated temperature T is applied to the controller 16. The data map represents a relationship between the remaining length "x" and the estimated temperature T, as indicated in the graph of FIG. 7. According to the relationship of FIG. 7, the estimated temperature T of the molten metal mass 32 is in the neighborhood of 1480° C. when the remaining length "x" is about 150 mm, and the estimated temperature T rises as the remaining length "x" decreases. When the remaining length "x" is zero, the estimated temperature T is 1540° C. As described below in detail, the data map of FIG. 7 is obtained by an experiment or test casting conducted to measure the remaining length "x" at different sampling temperature values of the molten metal 32, as indicated in the graph of FIG. 8.

Then, the control flow goes to step S9 in which the controller 36 determines the HEATER CONTROL signal SH on the basis of the above-indicated temperature regulating program stored in the read-only memory, and a difference $(T_0 - T)$, that is, an error or deviation of the estimated temperature T from the predetermined desired temperature $T_0$. The determined signal SH is applied to the heater power source 38 for controlling the induction heater 34, so as to regulate the actual temperature Tm of the molten metal 32 so that the temperature Tm coincides with the desired temperature $T_0$. For regulating the temperature Tm in the step S9, which is implemented for each of the second and subsequent casting cycles or shots, the actual temperature Tm is not measured by the thermocouple 40 as in step S3 implemented for only the first casting cycle. As described above, the regulation of the temperature Tm of the molten metal 32 in the step S9 for the second and subsequent casting cycles is effected based on the estimated temperature T determined from the remaining length "x" of the tube 52, prior to the commencement of a mold filling operation with the elevator 16 lowered to the casting position.

Step S9 is followed by step S10 to determine whether a predetermined time "ta" has elapsed after the commencement of the temperature regulation in step S9. This time "ta" is determined in view of an expected delay or response time of a change in the temperature Tm of the molten metal 32 with respect to the moment of commencement of the temperature regulation by the induction heater 34. The time "ta" may be a predetermined constant time, or may be determined by a suitable data map representative of a functional relationship between the time "ta" and a suitable parameter such as an amount or rate of change of the value of the HEATER CONTROL signal SH. After the time "ta" has elapsed, the control returns to step S5 to start the next casting cycle or shot with a new mold assembly 22, 24, 52 loaded on the elevator 16. In this way, the series of casting operations are continuously performed, that is, five casting cycles are performed using five mold assemblies. The routine of FIG. 5 is terminated when the number "n" of the casting cycles performed is equal to "5".

In the present embodiment, step S7 is implemented by the TV camera 64 and the temperature calculating computer 68, to detect the amount or degree of consumption (in the form of the remaining length "x") of the immersed end portion of the pouring tube 52, and step S8 is implemented by the computer 68 to obtain the estimated temperature T of the molten metal 32, on the basis of the data map of FIG. 7. Further, step S9 is implemented by the controller 36, heater power source 38 and induction heater 34, to regulate the actual temperature Tm of the molten metal 32 on the basis of the estimated temperature T.

Figure 6:
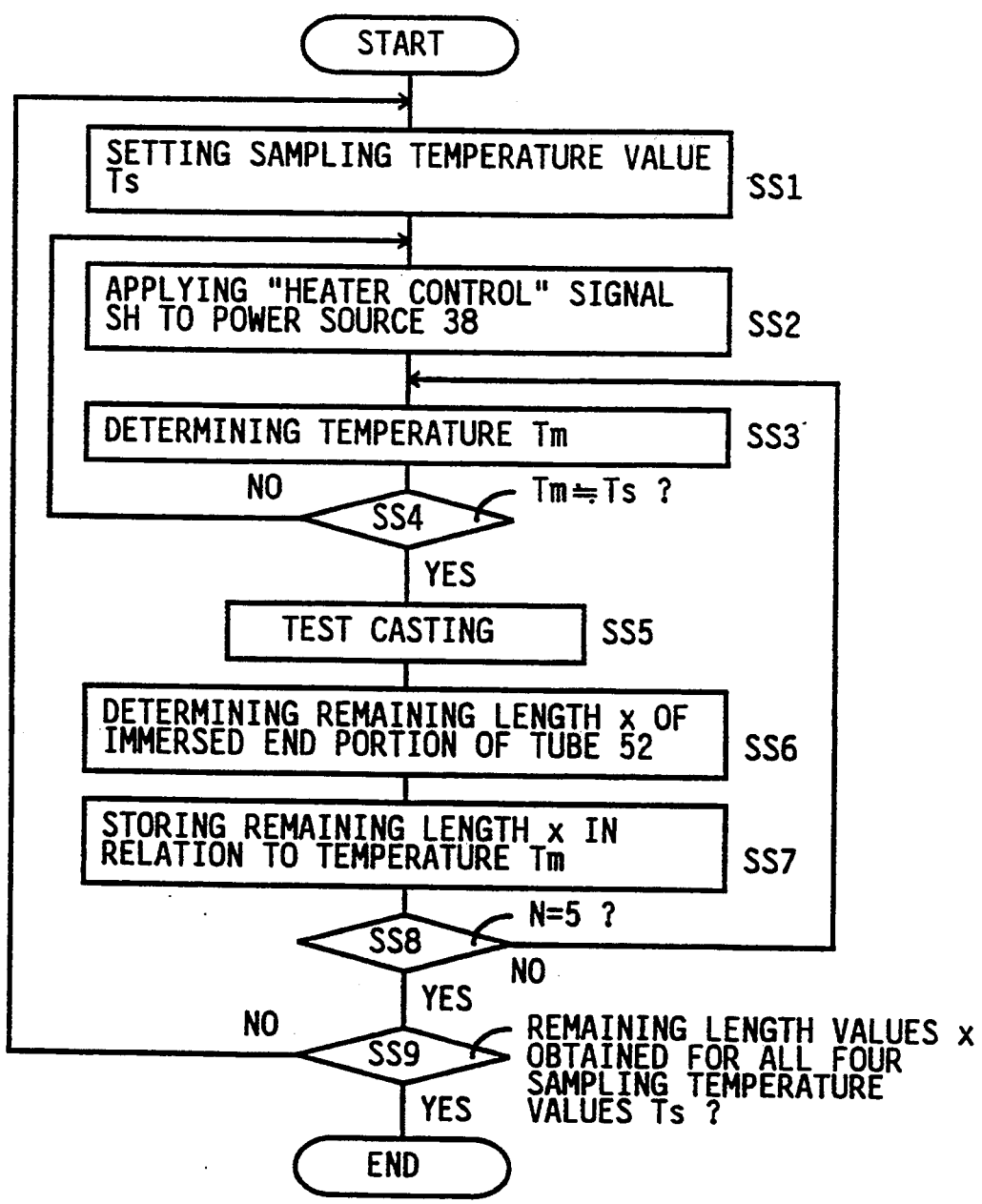
FIG. 6 is a flow chart illustrating an operation to obtain T-x relationship data of FIG. 8.

The Tm-x relationship data as shown in FIG. 8 may be obtained by a test casting operation according to a routine illustrated in the flow chart of FIG. 6. Initially, step SS1 is implemented to set one of a plurality of sampling temperature values Ts which are suitably selected to obtain a data map as shown in FIG. 7. For example, if the predetermined desired temperature $T_0$ of the molten metal 32 is set at 1510° C., four sampling temperature values 1480° C., 1500° C., 1520° C. and 1540° C. are selected so as to cover a sampling range from 1480° C. up to 1540° C., whose center is the desired temperature $T_0$. These selected sampling temperature values are entered into the controller 36, through a suitable alphanumeric keyboard. Each time step SS1 is implemented, the sampling temperature value to be set as effective value Ts is changed, beginning with the lowest value. Step SS1 is followed by step SS2 in which the HEATER CONTROL signal SH is supplied from the controller 36 to the heater power source 38, to control the induction heater 34 so that the actual temperature Tm of the molten metal 32 in the ladle 30 is equal to the set sampling temperature value Ts. Then, the control flow goes to step SS3 in which the controller 36 determines the temperature Tm, on the basis of the TEMPERATURE signal STm received from the thermocouple 40 whose detecting portion is immersed in the molten metal mass 32. The detecting portion of the thermocouple 40 is replaced with a new one after each implementation of step SS3, to assure accurate detection or measurement of the actual temperature Tm.

Step SS3 is followed by step SS4 to check if the temperature Tm determined is almost equal to the sampling temperature value Ts set in step SS1. Described in detail, step SS4 is provided to determine whether the temperature Tm is within a range of Ts±2° C. If the temperature Tm is outside this specified range, the control returns to step SS2. Steps SS2 through SS4 are repeatedly implemented until an affirmative decision (YES) is obtained in step SS4. If the temperature Tm is within the specified range or has been controlled to fall within the range, the following step SS5 is implemented to effect casting as described below.

In step SS5, the hydraulic cylinder 42 is activated to lower the elevator 16 to the casting position, and the vacuum pump 50 is activated to start evacuating the pressure-tight closure member 46 and the mold cavity 58, to fill the cavity 58 with the molten metal 32. As explained above, the immersed end portion of the pouring tube 52 is consumed in a degree corresponding to the actual temperature Tm of the molten metal 32. After the mold assembly 22, 24, 52 is unloaded, the control goes to step SS6 to determine the remaining length "x" of the immersed end portion of the pouring tube 52 on the basis of the VIDEO signal SV supplied from the TV camera 64 to the temperature calculating computer 68. Then, step SS7 is implemented to store, in the random-access memory of the computer 68, the remaining length "x" determined in step SS6, in relation to the actual temperature Tm determined in step SS3. The control then goes to step SS9 to determine whether the number N of the test casting cycles performed is equal to a predetermined number ("5" in this example). If a negative decision (NO) is obtained in step SS8, the control returns to step SS3 to determine the actual temperature Tm on the basis of the TEMPERATURE signal STm obtained using the thermocouple 40 with the fresh detecting portion. After the actual temperature Tm is adjusted to the set sampling value Ts in steps SS2 through SS4, steps SS5 through SS7 are again implemented to store the determined remaining length "x" in relation to the actual temperature Tm determined in step SS3.

If the affirmative decision (YES) is obtained in step SS8 after the five test casting cycles have been completed, the control goes to step SS9 to determine whether the last sampling value Ts has been set in step SS1, that is, whether the remaining length values "x" for all the sampling temperature values Ts have been obtained. If the first sampling temperature value Ts=1480° C. has been set in step SS1, for example, the control returns to step SS1 to set the next (second) sampling temperature value TS=1500° C., for obtaining the five remaining length values "x" at the sampling temperature value of 1500° C. Similarly, the remaining length values "x" for the third and fourth sampling temperature values 1520° C. and 1540° C.

Thus, the five remaining length values "x" of the tube 52 are stored in relation to each of the four sampling temperature values Ts, as indicated in the graph of FIG. 8. Based on the thus obtained Tm-x relationship data of FIG. 8, the temperature calculating computer 68 prepares the data map representative of the T-x relationship as indicated in the graph of FIG. 7. The prepared data map is stored in the computer 68.

It will be understood from the above explanation of the present embodiment that the temperature calculating computer 68 determines in step S7 the remaining length "x" of the immersed end portion of the pouring tube 52 after each casting cycle, on the basis of the VIDEO signal SV received from the TV camera 64, and obtains in step S8 the estimated temperature T of the molten metal 32 on the basis of the determined remaining length "x" and according to the data map of FIG. 7 representative of the T-x relationship, and that the controller 36 controls in step S9 the induction heater 34 of the ladle 30, based on the estimated temperature T, to regulate the actual temperature Tm of the molten metal 32 in the ladle 30. The present embodiment is thus capable of regulating the actual temperature Tm so as to coincide with the predetermined desired or optimum temperature T₀, with high accuracy, permitting the production of desired castings with improved quality, while minimizing defects due to a variation or fluctuation of the temperature Tm of the molten metal mass 32 used for a plurality of casting cycles or shots. In particular, the estimated temperature T of the molten metal 32 is obtained from the remaining length values "x", that is, the degrees of consumption of the immersed end portions of the pouring tubes 52 used in the individual casting cycles. The thus obtained estimated temperature T is used to regulate the actual temperature Tm of the molten metal 32. Accordingly, the required cost for the regulation of the molten metal temperature in the present embodiment is considerably reduced as compared with the temperature regulation using an expensive thermocouple whose detecting portion is consumed after a single use in the molten metal and should be replaced with a new one after each casting cycle. Thus, the present embodiment permits economical production of desired castings with improved quality. Further, the present embodiment is adapted to prepare the data map of FIG. 7, on the basis of the remaining length values "x" obtained in a test casting operation which is performed at different sampling temperature values Ts, on the actual casting system, in the same operating conditions as in the production run. In this respect, the temperature T of the molten metal 32 can be accurately estimated with a minimum error due to a difference in the operating environment between the production run and the test run to obtain the data map of FIG. 7.

To confirm the performance of the present continuous differential-pressure casting method over the conventional counterpart which does not rely on the estimated temperature T, there was conducted an experiment consisting of a total of 20 casting cycles (5 cycles ×4). Of the 20 castings produced according to the conventional method, the seven castings had some type of defects. Namely, the three castings suffered from the so-called "misrun", and the four castings suffered from blowholes. None of the castings produced according to the present method, however, suffered from such defects.

Figure 9:
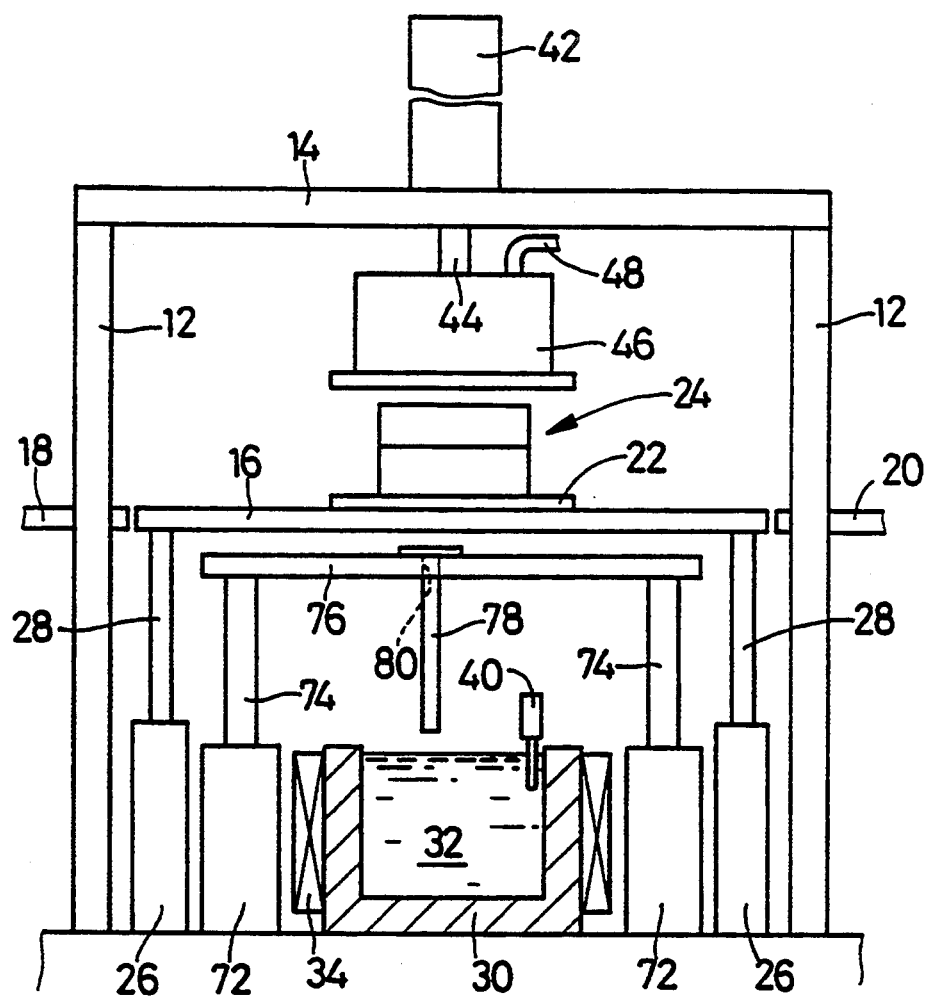
FIG. 9 is a view corresponding to that of FIG. 1, showing a modified casting system also suitable for practicing the method of the invention, in which the pouring tube is not fixed to the mold assembly, contrary to the tube shown in FIG. 1.

Referring next to FIG. 9, there will be described another embodiment of this invention, which uses a modified casting system. In this second embodiment, the same reference numerals as used in the first embodiment are used to identify the corresponding components, which will not be described below to avoid redundant description.

In the embodiment of FIG. 9, a second elevator 76 is provided in addition to the elevator 16 used in the first embodiment. Like the first elevator 16, the second elevator 76 are supported by output rods 74 of four constant-pressure cylinders 72, such that the second elevator 76 has a predetermined initial height smaller than that of the first elevator 16. The second elevator 76 has a hole 80 for removably holding a pouring tube 78 such that the tube 78 extends downward through the hole 80, and such that a flange provided at the upper end of the tube 78 contacts the upper surface of the elevator 76. This pouring tube 78 is more resistant to heat than the tube 52, and is consumed by an reduced amount at the immersed lower end portion in each casting cycle, than the tube 52, so that the tube 78 can be used for a predetermined number (m) of successive casting cycles or shots, which is smaller than the number (e.g., "5" as in the first embodiment) of the cycles to be performed in each series of casting operations. After the predetermined number of casting cycles, for example, two casting cycles, are performed, the pouring tube 78 is replaced with a new one.

When the first elevator 16 is lowered from the position of FIG. 9 by the hydraulic cylinder 42, together with the mold assembly 22, 24 and closure member 46, the first elevator 16 comes into abutting contact with the upper surface of the second elevator 76, while at the same time the lower surface of the surface plate 22 contacts the flange of the tube 78, whereby the tube 78 is pressure-tightly connected to the sprue hole 60 of the mold 24. With a further downward movement of the first elevator 16 by the cylinder 42, the second elevator 76 is lowered with the first elevator 16, down to the casting position.

In the casting position in which the lower end portion of the pouring tube 78 is immersed in the mass of molten metal 32, the mold 24 pressure-tightly enclosed by the closure member 46 and the surface plate 22 is evacuated by the activation of the vacuum pump 50, as in the first embodiment, whereby the mold cavity 58 is filled with the molten metal. During the mold filling, the immersed lower end portion of the tube 78 is more or less melted and thus consumed. The mold 24 filled with the molten metal is raised with the first and second elevators 16, 76, whereby the lower end portion of the tube 78 is pulled out of the molten metal mass 32 in the ladle 30. A casting cycle described above is repeated. When the number of the casting cycles becomes equal to the predetermined number (m), a picture of the consumed lower end portion of the tube 78 used for the predetermined number (m) of casting cycles is taken by suitable means such as a TV camera as used in the first embodiment, and the remaining length x' of the immersed lower end portion of the tube 78 is determined on the basis of the VIDEO signal SV. Then, the estimated temperature T of the molten metal 32 is determined according to a stored data map representative of the relationship between the remaining length x' and the estimated temperature T, similar to that of FIG. 7.

The actual temperature Tm of the molten metal mass accommodated in the ladle 30 is regulated based on the estimated temperature T obtained from the amount or degree of consumption (remaining length x') after the predetermined number (m) of casting cycles, so that the actual temperature Tm coincides with the desired temperature $T_0$ with high accuracy. According to the present second embodiment wherein one pouring tube 78 is used for two or more casting shorts or cycles, the regulation of the temperature of the molten metal 32 is economical, leading to further reduction in the cost of production of the castings.

While the present invention has been described in detail in its presently preferred embodiments, it is to be understood that the invention is not limited to the details of the illustrated embodiments, but may be otherwise embodied.

In the illustrated embodiments, the remaining length "x" of the immersed lower end portion of the pouring tube 52, 78 is determined by processing the VIDEO signal SV representative of a picture including an image of the immersed lower end portion of the tube taken by the TV camera 64. However, the TV camera 64 and the scale 66 may be replaced by a sensing member which is movable relative to the unloading table 20 in the vertical direction, so that the sensing member is abuttable on the extremity of the lower end portion of the tube 52, 78, to detect the position of that extremity. In this case, the remaining length "x" can be obtained from a distance between the thus detected position of the extremity of the immersed end portion of the used tube, and the known position of the lower extremity of the non-consumed lower end portion of a new pouring tube before being immersed in the molten metal mass.

The illustrated embodiments are adapted to use the remaining length "x" of the immersed lower end of the tube 52, 78, as a parameter indicative of the degree of consumption of the immersed tube. However, the degree of consumption of the immersed lower end of the tube may be detected by detecting an outside or inside diameter of the immersed lower end, at a predetermined position below the surface of the molten metal mass 32 in the ladle 30. Alternatively, the degree of consumption of the tube 52, 78 may be detected by measuring the weight of the immersed tube after the tube is removed from the surface plate 22 or second elevator 78. It is also possible to determine the degree of consumption of the tube, on the basis of a surface area of an image of the immersed lower end of the tube taken by the TV camera 64, that is, a cross sectional area of the immersed lower end taken in a plane parallel or perpendicular to the longitudinal direction of the tube. In any of these alternative parameters including the use of the remaining length "x", the operator may visually determine the parameter in question as provided on suitable display or measuring means, for example, and determine the estimated temperature T according to a known relationship between the parameter in question and the temperature T. The determined estimated temperature T may be keyed into the controller 36 to automatically regulate the actual temperature Tm, or manually control the induction heater 34 through the hydraulic controller 62, based on the determined estimated temperature T.

In the illustrated embodiments, the casting position is lowered to lower the pouring tube 52, 78, by activating the hydraulic cylinder 42 through the hydraulic controller 62, as the number n of the casting cycles performed increases, so that the lower end portion of the tube 52, 78 is always immersed in the molten metal mass 32 over the predetermined constant length "s". However, the casting position of the elevator 16 (or elevators 16, 76) may be fixed with respect to the ladle 30. In this case, the initial immersion length "s" is shortened as the number of the casting cycles performed increases, namely, as the surface of the molten metal mass 32 in the ladle 30 is lowered. This change in the immersion length "s" will affect the detected amount or degree of consumption (e.g., remaining length "x") of the tube even if the temperature Tm of the molten metal 32 is constant, but the temperature Tm can be accurately estimated on the basis of the detected degree of consumption of the tube, by using an appropriate one of data maps prepared for respective numbers of the casting cycles performed. In this case, the x-Tm relationship data as shown in FIG. 8, for example, should be obtained for each of the different immersion lengths "s" in the different casting cycles performed with different volumes of the molten metal 32 left in the ladle 30.

While the first embodiment of FIGS. 1-8 is adapted to regulate the temperature Tm of the molten metal on the basis of the estimated temperature T after each casting cycle is completed, this embodiment may be modified to obtain the estimated temperature T and regulate the temperature Tm after a predetermined number of casting cycles are completed, for example, every two or three casting cycles.

In the illustrated embodiments, ingots of the material for the molten metal are introduced in the ladle 30 and melted by the heater 34 after each series of casting operations (consisting of five cycles or shots), so that the amount of the molten metal consumed is compensated for by the newly introduced ingots, in order to prepare a predetermined initial volume of the molten metal for the next series of casting operations. However, the initial volume of the molten metal after the introduction of ingots may vary. In the illustrated embodiment, such a variation in the initial volume of the molten metal is not taken into account in regulating the temperature of the molten metal. Usually, the deviation of the actual temperature Tm of the molten metal 32 from the desired temperature is comparatively small in the first casting cycle, and therefore the regulation of the temperature Tm based on the remaining length "x" after the first cycle may be eliminated. In view of this fact, the following compensation is considered possible, for example, to reflect the variation in the initial volume of the molten metal on the regulation of the actual temperature Tm of the molten metal. That is, a compensating coefficient for adjusting the remaining length values "x" after the second and subsequent cycles is obtained by comparing the remaining length "x" after the first cycle with a reference or nominal length "x₀" after the first cycle. The estimated temperature T is obtained on the basis of the remaining length values "x" as adjusted by the compensating coefficient, and according to the appropriate data map. Alternatively, the data map used is adjusted by the compensating coefficient, and the estimated temperature T is obtained on the basis of the remaining length values "x" and according to the adjusted data map. This arrangement assures accurate estimation of the temperature of the molten metal, irrespective of possible variation in the initial volume of the molten metal before each series of casting operations.

In the second embodiment of FIG. 9, the degree of consumption (remaining length "x") of the pouring tube 78 is detected to regulate the temperature Tm of the molten metal after the number of casting cycles performed becomes equal to a predetermined number "m". However, the degree of consumption of the tube 78 may be detected each time a casting cycle is completed. In this case, the degree of consumption of the tube 78 increases with an increase in the number of casting cycles performed. Accordingly, different data maps as indicated in FIG. 7 should be prepared from respective sets of x-Tm relationship data as indicated in FIG. 8, which correspond to respective numbers of casting cycles performed. In this case, the estimated temperature T of the molten metal 32 is obtained according to one of the data maps which corresponds to the number of casting cycles already performed.

The illustrated embodiments are adapted to obtain the x-Tm relationship data of FIG. 8 for preparing x-T relationship data map of FIG. 7, by conducting a test casting operation in which four sampling temperature values Ts (more specifically, 1480° C., 1500° C., 1520° C. and 1540° C.) are sequentially set in step SS1, and the five remaining length values "x" of the tube 52, 78 are obtained for each of the four sampling temperature values Ts in the following steps. However, the sampling temperature values Ts and the number of the remaining length values "x" to be obtained may be changed as desired, provided the modified manner of obtaining the x-Tm relationship data permits suitable data map or maps to be prepared for obtaining the estimated temperature T. For instance, the lowest and highest sampling temperature values 1480° C. and 1540° C. may be changed to 1490° C. and 1530° C., respectively, in view of the fact that the actual temperature Tm of the molten metal 32 is adjustable by the heater 34, within a range between 1500° C. and 1520° C. It is also possible to obtain the x-Tm relationship data as indicated in FIG. 8, by simply immersing the tube 52, 78 in a mass of molten metal at different temperatures, without actually filling the mold 24 with the molten metal within the casting equipment.

The casting systems used in the illustrated embodiments use the high-frequency induction heater 34 as part of the means for regulating the actual temperature Tm of the molten metal mass 32 accommodated in the ladle 30. However, the heater 34 may be replaced by a low-frequency induction heater or other heating device utilizing an electric energy, or a burner or other heating device utilizing a thermal energy or a fuel, provided such heating device is capable of regulating the amount of heat generated.

In the illustrated embodiments, the upper end of the pouring tube 52, 78 is connected or adapted to be connectable to the sprue hole 60 which is open in the lower surface of the lower half 56 of the mold 24. However, the tube 52, 78 may be connected or adapted to be connectable to a sprue hole which is formed in the upper half 54 of the mold 24 or at the interface of the upper and lower halves 54, 56 of the mold.

While the pouring tube 52, 78 is made of a metal similar to the material of the molten metal 32, the material of the tube may be suitably selected depending upon the temperature of the molten metal and the length of time for which the lower end of the tube is immersed in the molten metal. In any case, however, the immersed end portion of the tube should be partially melted or consumed in the molten metal mass, but should not be totally melt or consumed.

The illustrated casting systems use the closure member 46 which cooperates with the surface plate 22 to pressure-tightly enclose the mold 24 when the mold 24 is evacuated by the vacuum pump 50, to produce a difference between the pressures to which the mold 24 and the ladle 30 (molten metal mass 32) are exposed, respectively, so that the molten metal 32 in the ladle 30 is sucked into the mold cavity 58, due to the pressure difference. However, the differential-pressure casting method according to the present invention may be equally effected by applying a pressure higher than the atmospheric pressure to the molten metal mass 32, by suitable pumping or pressurizing means, while the mold 24 is placed under the atmospheric pressure, so as to produce a pressure difference between the ladle 30 and the mold 24, so that the molten metal in the ladle 30 under the elevated pressure is forced to flow through the tube 52, 78 into the mold cavity 58 under the atmospheric pressure.

The illustrated embodiments are adapted to lower the elevator 16 to the casting position in which the lower end portion of the tube 52, 78 is immersed in the mass of molten metal 32. However, the lower end portion of the tube may be immersed in the molten metal mass 32 by elevating the ladle 30 so that the surface of the molten metal mass is raised to a predetermined level. Further, the hydraulic cylinder 42 to move the elevator 16 may be replaced by various other devices such as a device including an electric motor and a feed screw. Similarly, a Suitable device may be employed to raise the ladle 30.

The illustrated embodiments are adapted to activate the induction heater 34 to melt the ingots introduced into the ladle 30 each time a predetermined number of casting cycles are completed, to prepare a predetermined initial volume of molten metal 32 accommodated in the ladle 30 for the next series of casting operations. However, a predetermined volume of molten metal corresponding to the amount of consumption of the molten metal in the ladle 30 may be prepared outside the casting system and added to the molten metal mass 32 left in the ladle 30.

While the temperature calculating computer 68 is provided as a unit separate from the controller 36, the controller 36 may be modified to achieve the function of the computer 68.

While the pouring tube is used for estimating the temperature of the molten metal in the laddle 30, any other type of consumable material such as a consumable rod may be used to estimate the temperature of the molten metal on the basis of the degree of consumption of such consumable material detected after its immersion in the molten metal mass under a predetermined condition (e.g., length, time and number of immersion). In this case, the consumable material is immersed in the molten metal mass by a suitably designed exclusive device, or by a device which utilizes the hydraulic cylinder 42 to move the consumable material with respect to the laddle 30. However, the consumable material may be manually immersed. For detecting the degree of consumption (e.g., reduced length, weight or cross sectional area) of the immersed material, the detecting device described above with respect to the pouring tube 52 may be used, for example.

It is to be understood that the present invention may be embodied with various other changes, modifications and improvements, which may occur to those skilled in the art, in the light of the foregoing teachings.

What is claimed is:

1. A continuous differential-pressure casting method wherein a plurality of casting cycles are continuously performed with respective molds and a common mass of molten metal accommodated in a container, such that in each casting cycle, a cavity formed in the corresponding mold is filled with the molten metal through a pouring tube which is connected at one end thereof to a sprue hole of the mold and immersed at the other end thereof in said common mass of molten metal, said molten metal being introduced into said cavity due to a difference between pressures to which each of said molds and said container are exposed, respectively, to cast an article having a shape corresponding to that of said cavity, said method comprising the steps of:

detecting a degree of consumption of the pouring tube which occurs at said other end and which changes with an actual temperature of said mass of molten metal in said container, after a predetermined number of casting cycles are completed;

obtaining an estimated temperature of said mass of molten metal, on the basis of the detected degree of consumption of said pouring tube, and according to a predetermined relationship between said degree of consumption and said estimated temperature; and regulating said actual temperature of said mass of molten metal, on the basis of a difference between the obtained estimated temperature and a predetermined desired temperature of said mass of molten metal.

2. A continuous differential-pressure casting method according to claim 1, wherein said predetermined number of casting cycles is equal to one.

3. A continuous differential-pressure casting method according to claim 1, wherein said pouring tube is attached at said one end to a mold assembly which includes said each mold and which is moved to a predetermined casting position in which said cavity is filled with said molten metal through said pouring tube, said mold assembly being moved with said pouring tube to a detecting position in which the degree of consumption of the pouring tube is detected each time a casting cycle is completed with said mold assembly.

4. A continuous differential-pressure casting method according to claim 1, wherein said predetermined number of casting cycles is smaller than the number of said plurality of casting cycles to be continuously performed.

5. A continuous differential-pressure casting method according to claim 3, wherein said pouring tube is disposed such that said tube is connectable to said sprue hole of said each mold when a mold assembly including said each mold is moved relative to said pouring tube, toward a casting position in which said cavity is filled with said molten metal through said pouring tube, said degree of consumption of said pouring tube being detected with said tube separated from said mold assembly.

6. A continuous differential-pressure casting method according to claim 1, wherein said degree of consumption of said pouring tube is detected by detecting a remaining length of an end portion of said tube which remains after said end portion is immersed over a predetermined length in said mass of molten metal.

7. A continuous differential-pressure casting method according to claim 6, wherein said length of said end portion of said pouring tube is detected by processing a video signal representative of a picture which includes an image of said end portion of said pouring tube.

8. A continuous differential-pressure casting method according to claim 6, wherein said length of said end portion of said pouring tube is detected by a physical contact of a sensing member with an extremity of said end portion of said tube.

9. A continuous differential-pressure casting method according to claim 1, wherein said degree of consumption of said pouring tube is detected by detecting a diameter an end portion of said tube after said end portion is-immersed in said mass of molten metal.

10. A continuous differential-pressure casting method according to claim 1, wherein said degree of consumption of said pouring tube is detected by measuring a weight of said tube after said tube is immersed in said mass of molten metal.

11. A continuous differential-pressure casting method according to claim 1, wherein said degree of consumption of said pouring tube is detected by detecting a cross sectional area of an end portion of said tube after said end portion is immersed in said mass of molten metal.

12. A continuous differential-pressure casting method according to claim 1, wherein said pouring tube is immersed in said common mass of molten metal over a predetermined constant length in all of said plurality of casting cycles.

13. A continuous differential-pressure casting method according to claim 12, wherein said estimated temperature of said mass of molten metal is obtained according to a single predetermined relationship which corresponds to said constant length.

14. A continuous differential-pressure casting method according to claim 1, wherein a length of said pouring tube over which said tube is immersed in said common mass of molten metal is shortened as a surface of said mass of molten metal is lowered as the number of casting cycles performed increases.

15. A continuous differential-pressure casting method according to claim 14, wherein said estimated temperature of said mass of molten metal is obtained according to a relationship selected from one of a plurality of predetermined relationships between different lengths of immersion of said pouring tube in said mass of molten metal and the estimated temperature.

16. A continuous differential-pressure casting method according to claim 1, further comprising the step of compensating for a variation in an initial volume of said common mass of molten metal before said plurality of casting cycles are initiated when detecting the degree of consumption of said pouring tube.

17. A continuous differential-pressure casting method according to claim 1, further comprising the step of compensating for a variation in an initial volume of said common mass of molten metal before said plurality f casting cycles are initiated when determining said predetermined relationship.

18. A continuous differential-pressure casting method according to claim 1, further comprising the step of obtaining said predetermined relationship between said degree of consumption and said estimated temperature.

19. A continuous differential-pressure casting method according to claim 18, wherein said predetermined relationship is obtained by conducting a test casting operation wherein said degree of consumption of said tube is detected at a plurality of sampling temperature values of said molten metal, to prepare a data map representative of said predetermined relationship.

20. A continuous differential-pressure casting method according to claim 1, wherein said actual temperature of said mass of molten metal is regulated by a heating device associated with said container.

21. A continuous differential-pressure casting method according to claim 20, wherein said heating device is an electrically operated heating device.

22. A continuous differential-pressure casting method according to claim 21, wherein said electrically operated heating device comprises an induction heater.

23. A continuous differential-pressure casting method according to claim 1, wherein at least an end portion of said pouring tube which is immersed in said common mass of molten metal is made of a metallic material similar to said molten metal.

24. A continuous differential-pressure casting method according to claim 1, wherein said molten metal is introduced into said cavity of said mold by evacuating said mold.

25. A continuous differential-pressure casting method according to claim 1, wherein said molten metal is introduced into said cavity of said mold by applying a pressure to said mass of molten metal in said container.

26. A continuous differential-pressure casting method according to claim 1, wherein said pouring tube is immersed in said mass of molten metal in said container, by lowering said pouring tube.

27. A continuous differential-pressure casting method according to claim 1, wherein said pouring tube is immersed in said mass of molten metal in said container, by raising a surface of said mass of molten metal.

28. A continuous differential-pressure casting method according to claim 1, further comprising the step of introducing an ingot of a metal for said molten metal, into said container each time said predetermined number of casting cycles are completed, an amount of said ingot corresponding to an amount of consumption of said molten metal accommodated in said container for said predetermined number of casting cycles.

29. A continuous differential-pressure casting method according to claim 28, wherein said ingot is heated into a molten state by a heating device associated with said container.

30. A continuous differential-pressure casting method according to claim 1, further comprising the step of introducing a predetermined volume of molten metal into said container each time said predetermined number of casting cycles are completed, said predetermined volume corresponding to an amount of consumption of said molten metal accommodated in said container for said predetermined number of casting cycles.

31. A continuous differential-pressure casting method according to claim 1, further comprising the step of measuring said actual temperature of said mass of molten metal in said container before a first one of said plurality of casting cycles is initiated.

32. A continuous differential-pressure casting method according to claim 31, wherein said actual temperature of said mass of molten metal in said container is measured by using a thermocouple whose detecting portion is immersed in said mass of molten metal.

33. A continuous differential-pressure casting method according to claim 31, further comprising the step of controlling said actual temperature of said mass of molten metal before said first casting cycle is initiated, so that said actual temperature is almost equal to said predetermined desired temperature.

34. A method of estimating a temperature of a mass of molten metal, comprising the steps of:
immersing a consumable material in said mass of molten metal, under a predetermined condition of immersion of said consumable material in said mass of molten metal, wherein said consumable material consists of an end portion of a pouring tube through which the molten metal is transferred from a container to a cavity formed in a casting mold;
detecting a degree of consumption of said consumable material after immersion thereof in said mass of molten metal under said predetermined condition, said degree of consumption changing with an actual temperature of said mass of molten metal; and obtaining an estimated temperature of said mass of molten metal, on the basis of the detected degree of consumption of said consumable material, and according to a predetermined known relationship between said estimated temperature and said degree of consumption of said consumable material under said predetermined condition of immersion.

35. A method according to claim 34, wherein said degree of consumption of said consumable material is detected by detecting a remaining length of said consumable material after said consumable material is immersed over a predetermined length in said mass of molten metal.

36. A method according to claim 34, wherein said consumable material is a metal having a melting temperature near that of said mass of molten material.

37. A method according to claim 34, further comprising the step of obtaining said predetermined known relationship by conducting a test wherein said degree of consumption (x) of said consumable material is detected under said predetermined condition, and at different sampling temperature values (Ts) of said mass of molten metal.

* * * * *